UNITED STATES PATENT OFFICE.

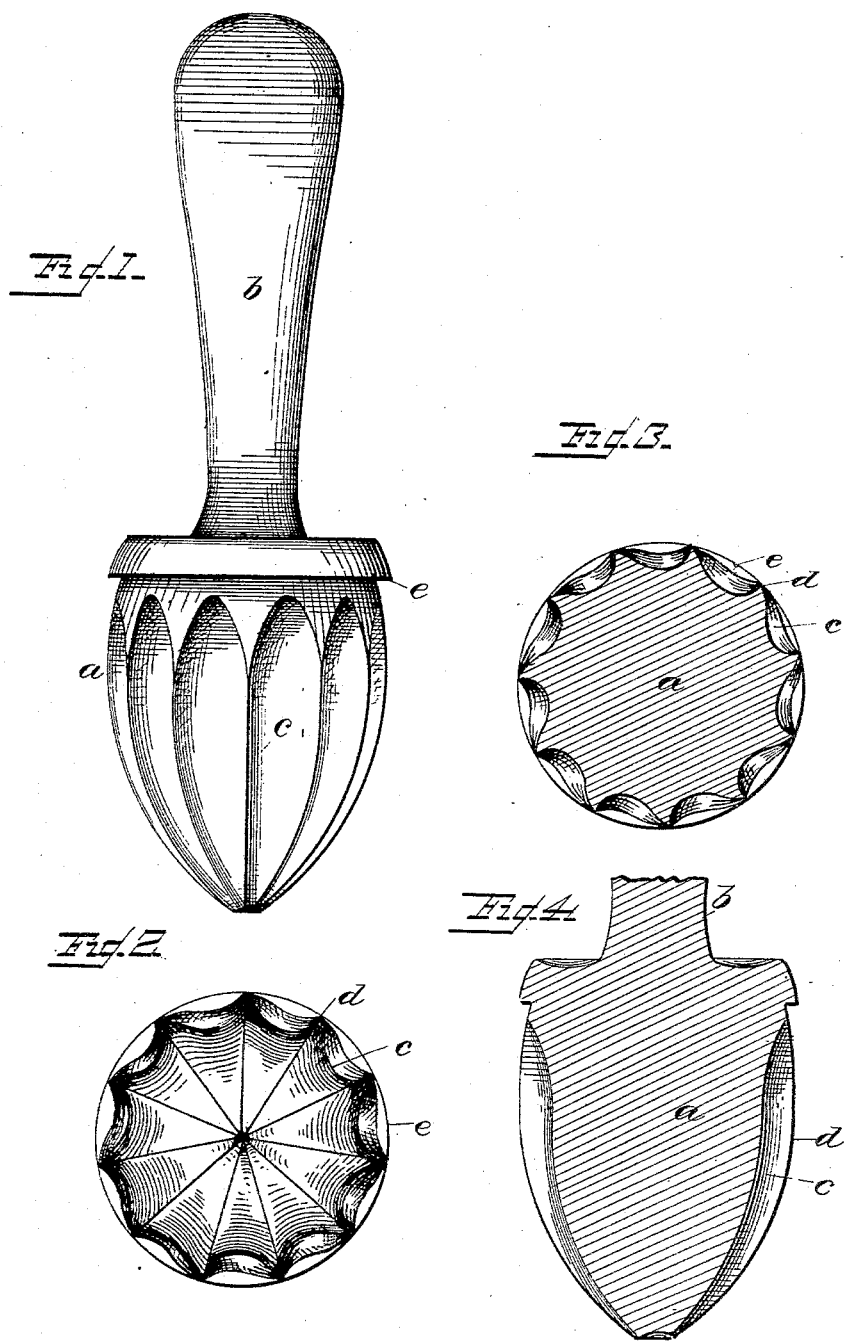

GEORGE W. CORNFORD, OF OLIVER, ASSIGNOR TO THEODORE M. TUPPER, DUANE OSBORNE, AND JARED VAN VLEET, ALL OF FLINT, MICHIGAN.

IMPLEMENT FOR EXTRACTING JUICE FROM LEMONS.

SPECIFICATION forming part of Letters Patent No. 303,812, dated August 19, 1884.

Application filed September 25, 1883. (No model.)

*To all whom it may concern:*

Be it known that I, GEORGE W. CORNFORD, a citizen of the United States, residing at Oliver, in the county of Huron and State of Michigan, have invented a certain new and useful Improvement in Lemon-Extractors, of which the following is a full, clear, and exact description.

This invention is in the nature of a device or implement for extracting the juice and meat or pulp of lemons, and has special reference to that class of such implements which are operated by hand directly upon the fruit placed in any convenient receptacle.

The invention consists in a semi-ovate or conical body, preferably of glass, having a handle, and provided with longitudinal superficial cavities or grooves starting from the base and terminating at nothing at the apex or point, the salient edges of which grooves form blades which may be tangential to the body, whereby when the end of a lemon is cut off and the implement placed vertically in said cut-off end and pressed or borne downward into or upon the lemon the juice of the lemon is extracted, and by a subsequent or simultaneous rotation of the implement while in the lemon the meat of the fruit is reduced to pulp and separated, thus obtaining all the desirable interior of the fruit, substantially as hereinafter specified and claimed.

In the accompanying drawings illustrating my invention, in the several figures of which like parts are similarly designated, Figure 1 is a side elevation; Fig. 2, a bottom plan view; Fig. 3 a horizontal section, and Fig. 4 a vertical section.

My lemon-extractor is made of wood, glass, or other suitable material, and has a body, *a*, and handle *b*, preferably in one piece. The body is semi or a little more than semi-ovate or conical, and its surface is provided with a series of grooves or cavities, *c*, extending longitudinally thereof from the surface near the base, and meeting and running to nothing, or nearly so, at the apex or point. The salient edges *d* of these grooves stand off, preferably tangentially, from the surface of the body, as clearly indicated in Figs. 2 and 3, and these edges are sufficiently sharp to pulp and remove the meat of the fruit without necessarily cutting it. The grooves are shallow and curvilinear, in order to prevent the adherence and accumulation of the pulp therein and be self-clearing. The base of the semi-ovate body at the termination of the grooves is provided with the rim *e*, which extends solid around the body, as a part thereof, and overhangs the grooves to afford a guard for the operator's hand against contact with the fruit.

In using my extractor the end of the lemon is cut off, and the lemon being stood on end in any suitable receptacle, the extractor is placed point down in such cut-off end, and downward pressure being exerted the edges *d* will divide the juice-cells, letting out their contents, and then by a rotary movement of the device the meat will be pulped and removed, very much after the manner of boring in wood or other substances.

I do not limit the invention to tangentially-arranged blades or cutting-edges, although they are preferably so made. Radial edges may be employed to advantage, provided the grooves are quite shallow or superficial, so as to become self-clearing.

I am aware of United States Letters Patent No. 63,304, dated March 26, 1867, and No. 101,128, dated March 22, 1870; but my invention differs from the inventions therein in that instead of V-shaped excisions to form the edges or blades I make the most superficial grooves, and with this advantage, namely, that there are no angles in which the pulp or juice may accumulate and render the device sour and unclean. In the said patents, furthermore, the excisions extend the entire length of the body, leaving openings at the base, and when downward pressure is exerted upon the fruit the juice and pulp will squirt up through these openings over the operator, whereas my solid base and rim prevent this, and the grooves, by their peculiar conformation, direct the juice laterally and into the vessel in which the operation is being performed. My invention is restricted to these details of difference.

What I claim is—

The herein-described improved lemon-extractor, consisting of the body $a$, having the superficial shallow grooves $c$ extending the length thereof and running to nothing at both ends, the edges $d$, the solid base-rim $e$, and the handle $b$, all substantially as shown and specified.

In testimony whereof I have hereunto set my hand this 17th day of September, A. D. 1883.

GEORGE W. CORNFORD.

Witnesses:
 JOHN ALGOE,
 P. W. GIBSON.